United States Patent [19]

Makino

[11] Patent Number: 4,831,868
[45] Date of Patent: May 23, 1989

[54] METHOD FOR ESTABLISHING LINK BETWEEN VEHICLE-MOUNTED ELECTRONIC CONTROL UNIT AND TESTING DEVICE

[75] Inventor: Fumio Makino, Osaka, Japan

[73] Assignee: Sumitomo Electric Industries, Ltd., Osaka, Japan

[21] Appl. No.: 168,316

[22] Filed: Mar. 17, 1988

[30] Foreign Application Priority Data

Mar. 17, 1987 [JP] Japan ................. 62-63490

[51] Int. Cl.$^4$ .................................... G01M 15/00
[52] U.S. Cl. .................................... 73/118.1; 73/126
[58] Field of Search ............. 73/118.1, 117.2, 117.3, 73/121, 123, 126; 371/33, 62; 364/579

[56] References Cited

U.S. PATENT DOCUMENTS

| 4,586,086 | 4/1986 | Ohzehi | 371/33 |
| 4,689,766 | 8/1987 | Kent | 371/62 |
| 4,710,928 | 12/1987 | Ueda | 371/62 |

Primary Examiner—Jerry W. Myracle
Attorney, Agent, or Firm—Wenderoth, Lind & Ponack

[57] ABSTRACT

A vehicle-mounted electronic control unit such as an anti-lock brake control unit is connected to a testing device through two serial transmission lines for testing. Upon startup of the control unit, signals are exchanged therebetween. Only if the signal exchange is completed in a predetermined period of time, the control unit enters into a special operation mode for testing. Otherwise, it is controlled in an ordinary mode. In this test mode, the data in the control unit such as a wheel speed are sent to the testing device to be inputted in its test programs. The testing device then gives to the control unit various command signals produced according to its programs. The control unit then sends test signals in response to the command signals to actuators. Thus, when the control unit is in the test mode, the testing device can control the actuators by transmitting command signals to the control unit and thus can test the performance of not only the control unit but also the actuators from various angles.

2 Claims, 5 Drawing Sheets

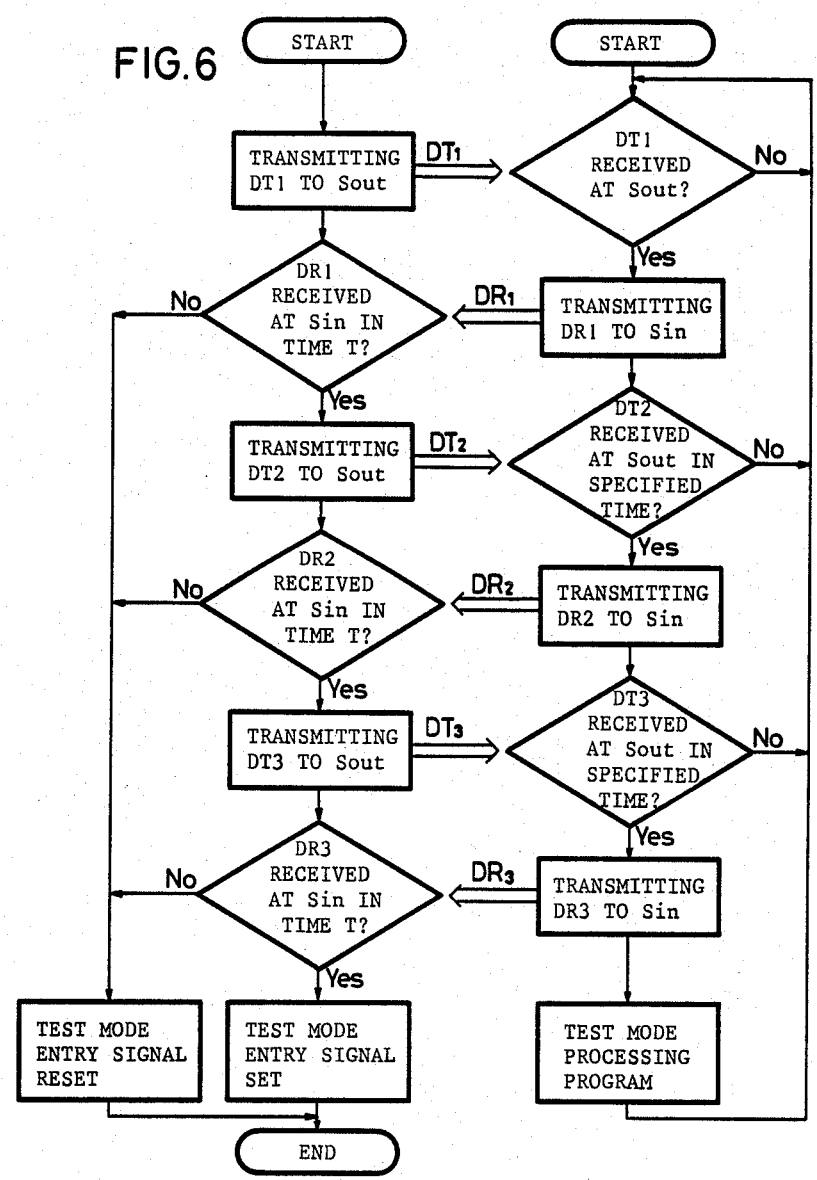

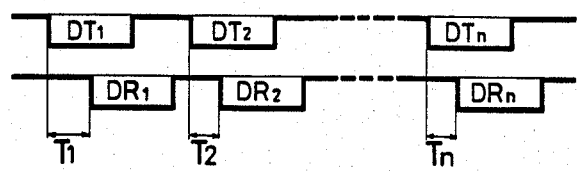
FIG. 7a
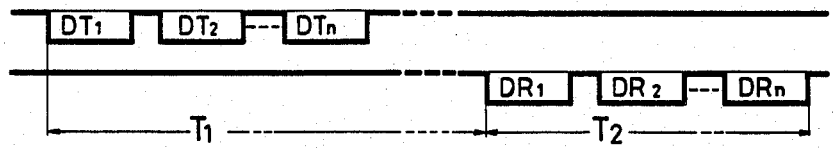
FIG. 7b
FIG. 8 PRIOR ART (TYPE 1)
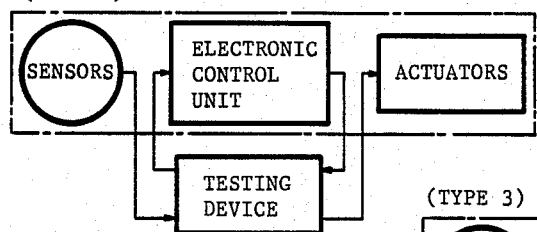
FIG. 9 PRIOR ART (TYPE 2)
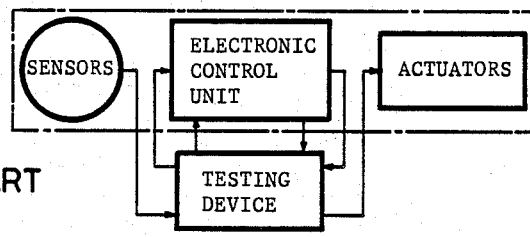
FIG. 10 PRIOR ART (TYPE 3)
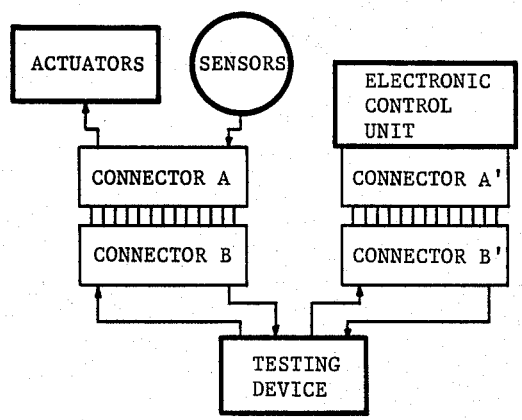
FIG. 11 PRIOR ART

METHOD FOR ESTABLISHING LINK BETWEEN VEHICLE-MOUNTED ELECTRONIC CONTROL UNIT AND TESTING DEVICE

The present invention relates to a method for establishing a link between a vehicle-mounted electronic control unit and an external testing device to test the electronic control unit with the testing device in order.

Modern automobiles, especially passenger cars, are equipped with various kinds of electronic control devices in addition to an electric circuit for controlling the ignition switch. Such electronic control devices include an anti-lock brake control device coupled to a brake system to improve the drivability and stability of the vehicle during driving, a traction control device provided to allow the vehicle to be accelerated while insuring that the tires always grip the road surface with the maximum frictional force, and control device for an electronically controlled suspension. Every kind of state-of-the-art electronics technology is incorporated in such control devices, thus making their circuit constructions very complicated.

Such electronic control devices are directly related to the control of the driving conditions of the vehicle and thus have a great influence on the safety of passengers' lives. Therefore, vehicles equipped with such electronic control devices have to be checked thoroughly before delivery and periodically in order to confirm that the control devices are functioning properly in all aspects.

The performance of the control devices has heretofore been tested by use of a method shown in FIG. 8 (hereinafter referred to as Type 1), one shown in FIG. 9 (Type 2) or one shown in FIG. 10 (Type 3) which is the combination of Type 1 and Type 2.

In Type 1, an electronic control unit (hereinafter abbreviated to ECU) is connected to sensors and actuators and operated in the same manner as in ordinary operations. When an output command signal at a predetermined potential level is transmitted from the testing device to the ECU, the information in the ECU for every step of its operational sequence is sent to the testing device.

In Type 2, the sensors, ECU and actuators are individually connected to the testing device. The testing device checks the signals from the sensors and sends them to the ECU to start it. The testing device checks up the signals from the ECU and transmits them to the actuators to start them up.

In Type 3, not only the signals are checked in the same manner as in Type 2, but the information in the ECU which is operating is also supplied to the testing device.

With the Type 1 method, though the information in the ECU can be read out by the testing device, the actuators cannot be freely controlled by the testing device but are controlled by the output signals from the ECU which are produced by ECU by processing the signals from the sensors. Thus, it is impossible to test the entire system including the sensors, ECU and the actuators.

With the Type 2 method, the testing device can check the output signals of the ECU after the ECU bar received and processed signals from the testing device. But it cannot read out the information in the ECU. Thus, a thorough checkup of the ECU also is not possible with this method.

Further, with the Type 2 and Type 3 methods, since the ECU is not directly connected with the other elements of the system, the testing device cannot test the entire system. For example, it is necessary to use testing connectors B and B' to connect the testing device for a before-delivery checkup as shown in FIG. 11. After the ECU has passed the test, the connectors B and B' have to be disconnected from the ECU and then a connector A has to be connected to a connector A' of the ECU to complete the system. The system is not tested with the last-mentioned connected state. Also, this adds additional work to the testing.

None of the abovesaid conventional methods contemplates to provide the ECU with a special operation mode for testing the performance of the circuit with the testing device (hereinafter referred to as a test mode). Due to a lack of the test mode, the testing of ECU is possible only within a limited range, and the actuators cannot be fully tested because the actuators cannot be freely controlled by the testing device.

If some abnormal sensor information should come into the ECU, it might malfunction suddenly during ordinary driving, causing the actuators to develop a serious trouble. It is impossible to prevent this beforehand.

An object of the present invention is to provide a method for establishing a link between a vehicle-mounted electronic control unit and an external testing device in which the testing device is connected with the sensors, ECU and actuators in a most rational manner, so that the electronic control system can be tested in its entity and in an actual running condition.

In accordance with the present invention, there is provided a method for establishing a link between an electronic control unit mounted on a motor vehicle and a testing device for testing the electronic control unit, characterized in that the electronic control unit is connected to the testing device through two serial transmission lines for transmitting and receiving signals so as to exchange data therebetween, in that the electronic control unit is provided with a special operation mode for testing, and in that upon energization the electronic control unit is adapted to transmit a plurality of data to the testing device and will enter into the special operation mode for testing only if it receives from the testing device a plurality of data in response to the data transmitted from the electronic control unit within a specified time, whereby establishing a link therebetween.

After connecting the testing device to the electronic control unit and starting the latter, a plurality of data stored in the memory unit of ECU are read out and transmitted to the testing device. In response, the testing device transmits signals to the ECU. Signals are thus exchanged therebetween a plurality of times. If such a signal exchange has been completed in a specified time, the electronic control unit enters into a special operation mode for testing after computing necessary data based upon the signals from the sensors. If the signal exchange has not completed in the specified period of time, the control unit will operate in an ordinary operation mode.

The present invention makes it possible to test the system in its entirety. A plurality of pieces of information can be conveyed through only two serial transmission lines unlike in the prior art. This minimizes the number of cables needed for testing. The electronic control unit can enter into a test mode only after it has passed through a processing sequence for entry into the test mode. There is no possibility with the present invention that any abnormal sensor information coming into the control unit may cause the control unit to malfunction or detect its own fault (self-check) or that the control unit may enter into a test mode abruptly while running, or not function when necessary, or trigger the malfunction of the actuators while in the test mode owing to its own malfunction.

Other features and objects of the present invention will become apparent from the following description taken with reference to the accompanying drawings, in which.

Figure 4:
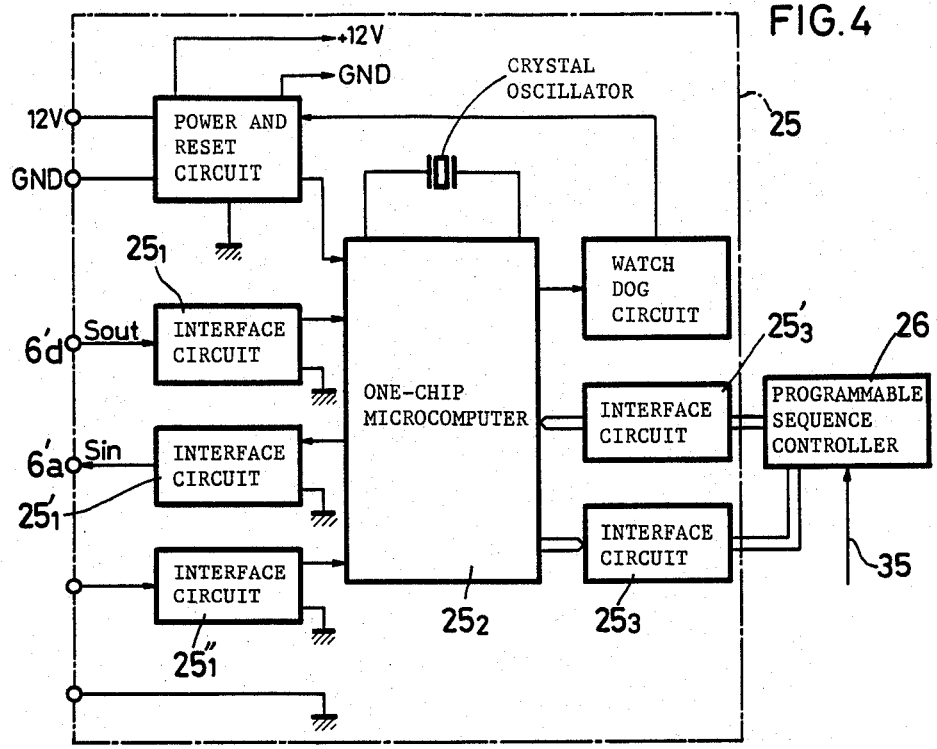
Figure 5:
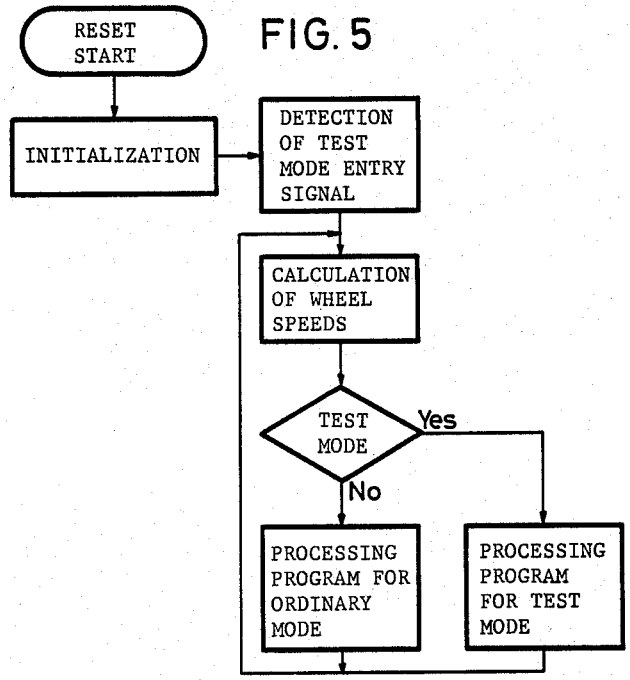

FIG. 4 a block diagram of the electronic control circuit of the testing device;

FIG. 5 is a flow chart showing the steps for entry into the test mode processing program;

FIG. 6 is a flow chart showing programs for entry into the test mode prepared in the vehicle-mounted electronic control unit and the testing device and the order of execution of the programs;

FIGS. 7a and 7b are views illustrating examples of signal exchange timing in the programs of FIG. 6;

FIGS. 8, 9 and 10 are views showing prior art testing methods; and

FIG. 11 is a view illustrating as an example a problem encountered by the prior art testing methods.

Figure 1:
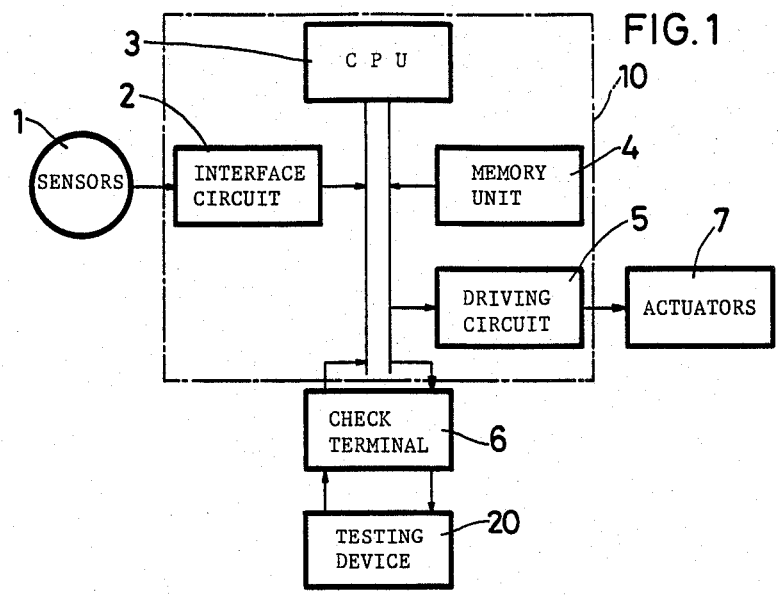
FIG. 1 is a schematic view showing how the electronic control unit and the testing device are linked together.

FIG. 1 schematically illustrates a linking method according to the present invention. Numeral 10 designates a typical prior art electronic control unit. Such a control unit may comprise an interface circuit 2 for waveform shaping and pulse shaping the signals from sensors 1 for sensing the wheel speeds, a central processing unit 3 (hereinafter referred to as CPU) for processing the signals, performing logical operations and giving command signals, a memory unit 4 for storing various kinds of processing programs, a driving circuit 5 for driving actuators 7, and a check terminal 6 to be connected to a testing device which will be described later.

The memory unit 4 contains a program for calculating a reference wheel speed on the basis of the signals from the sensors 1 if the electronic control unit is an anti-lock brake control device, a control program for driving the actuators in an ordinary mode, a processing program for a test mode which will be described later, and a special processing program for entering into the test mode.

Figure 2:
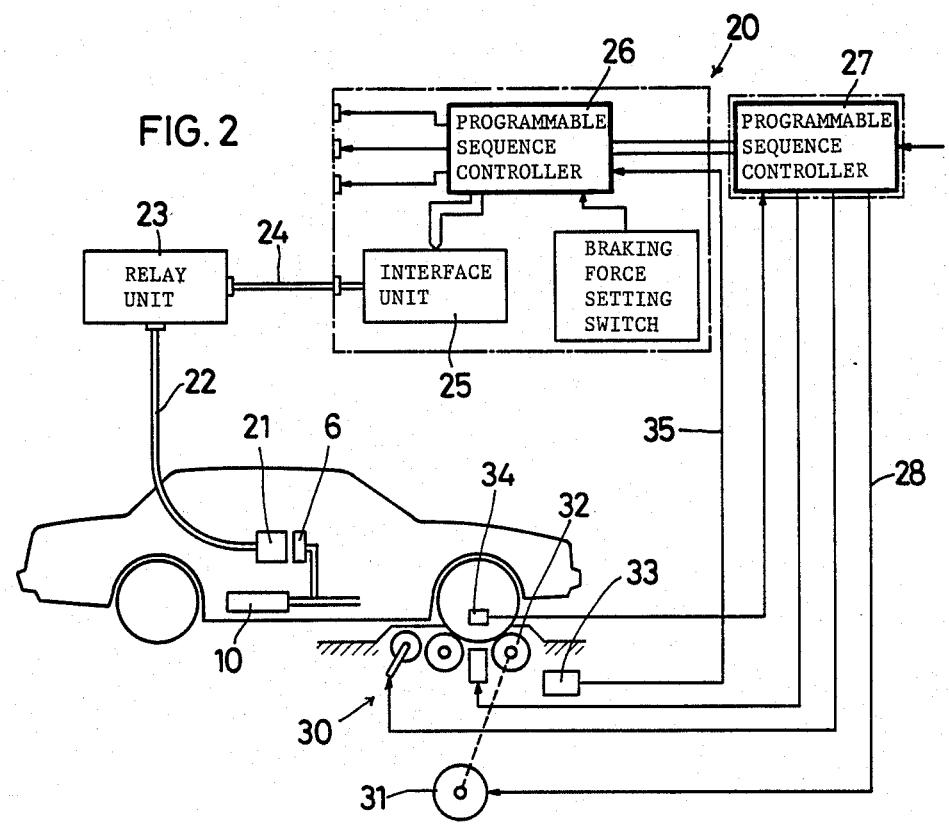
FIG. 2 is a schematic view of the entire testing device.

FIG. 2 shows the testing device 20 connected to the electronic control unit 10 mounted on an automobile. The testing device 20 comprises a check terminal 21, an interface unit 25, programmable sequence controllers 26 and 27 (in which 26 is for the interface unit 25 while 27 is for a brake tester) and the brake tester 30. These components are connected together by means of connector cables 22, 24, 28 and 35 as illustrated. The brake tester 30 comprises a motor 31, a roller 32 coaxially coupled to the motor, a braking force gauge 33 for measuring the braking effect, and a photoelectric switch 34 for measuring the load on the wheels.

Figure 3:
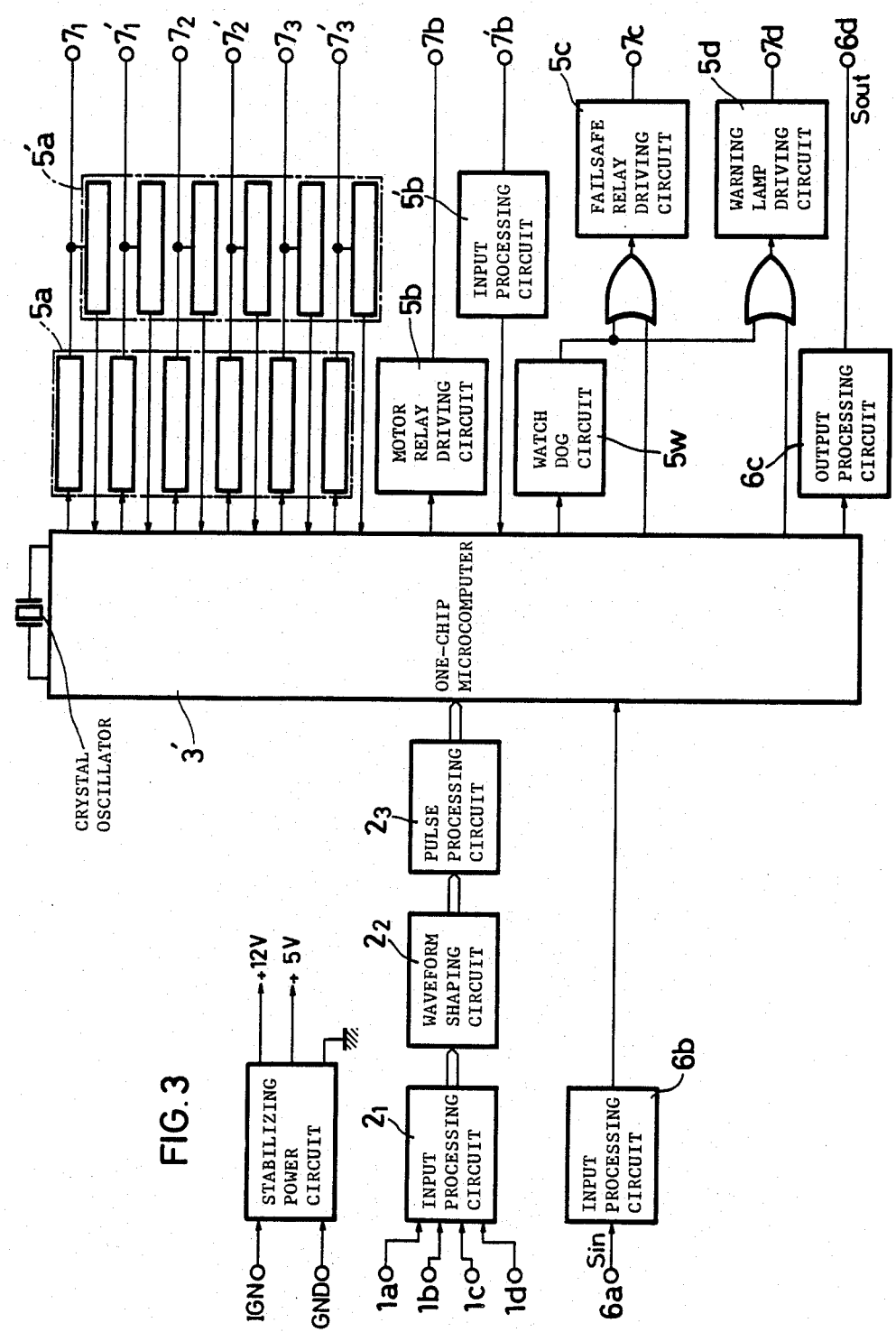
FIG. 3 is a block diagram of the electronic control unit an anti-lock brake control assembly.

FIG. 3 shows a typical anti-lock brake control unit as a specific example of the electronic control unit shown generally in FIG. 1. Since such a control device is well-known in the art, we shall describe its construction and function only briefly The electronic control unit comprises an input processing circuit $2_1$ for processing the signals from sensors $1a$ to $1d$ which represent the respective wheel speeds, a circuit $2_2$ for waveform shaping the processed signals, a pulse processing circuit $2_3$ for adjusting the pulse width and distance of the signals to make them suitable to be supplied as pulse signals, and a one-chip microcomputer $3'$ including a memory unit containing a program for calculating a reference wheel speed based upon the signals fed from the processing circuit, a processing program for ordinary control operations and a special processing program for entering into a test mode. The microcomputer is adapted to give command signals to its driven units which will be described later.

The electronic control unit further includes circuits $5$ to $5d$ for driving various kinds of actuators including solenoids $7_1$–$7_3$ and $7_1'$–$7_3'$ as pressure control valves in a hydraulic brake circuit, a motor relay $7b$ for a motor for a hydraulic unit, a failsafe relay $7c$ and a warning lamp $7d$. The solenoid driving circuits $5a$ are provided in three pairs, each pair for the front left wheel, front right wheel and both rear wheels. To monitor the driving circuits $5a$, there are provided three pairs of solenoid monitoring circuits $5a'$, each pair of which are allocated to the respective pairs of driving circuits $5a$.

In the same manner, the motor in the hydraulic unit is monitored by an input processing circuit $5'b$ which processes the signals from a monitor for the motor, and a watch dog circuit $5w$ is provided to monitor the failsafe relay driving circuit $5c$ and the warning lamp driving circuit $5d$.

In ordinary operations, the microcomputer $3'$ calculates actual wheel speeds and a reference wheel speed on the basis of the signals supplied from the sensors $1a$ to $1d$. Every time the wheel speed gets lower than the reference wheel speed as a result of braking, the brake is released momentarily. As soon as the reference wheel speed is recovered, the brake is applied again. These operations are repeated many times in a very short period of time to keep the tires from losing grip of the road surface owing to a slip and thus assure the maximum effectiveness of braking.

An input port $6a$ of a check terminal 6 is connected to the electronic control unit through a processing circuit $6b$ for the adjustment of the input level. The control unit is in turn connected to an output port $6d$ through an output processing circuit $6c$ for the adjustment of the output level.

FIG. 4 shows in block diagram the interface unit 25 which is the main part in the electronic control circuit of the testing device 20 shown in FIG. 2. The interface unit 25 comprises an input port $6'd$ and an output port $6'a$, interface circuits $25_1$ and $25_1'$ adapted to adjust the voltage levels at the input and output ports, a one-chip microcomputer $25_2$ containing in its memory unit a special processing program for entry into a test mode and adapted to give a command to exchange signals with the electronic control device 10 mounted on an automobile, and interface circuits $25_3$ and $25_3'$ for the adjustment of the input and output levels of the signals exchanged with the programmable sequence controllers 26 and 27 for the brake tester 30 of the testing unit 20.

As other check terminals, GND terminals and a warning lamp monitor are provided. The latter is provided to keep an eye on whether or not the testing device is in the test mode when it is connected to the control unit 10 through the check terminal 6 and to check the warning lamp driving circuit (of the electronic control unit 10). During the test mode, the warning lamp is blinking.

The testing device sends various commands after having been connected to the electronic control unit mounted on the automobile. In response to the command signals, the performance of the electronic control unit is tested in such a manner as described later.

The automobile equipped with the electronic control unit 10 is brought to such a position that the testing device 20 including the programmable sequence controllers 26 and 27 and the brake tester 30 can be connected as shown in FIG. 2. The programmable sequence controllers 26 and 27 are started to actuate the brake tester 30. In this embodiment, the front wheels are being checked by the brake tester. The clutch is kept in its neutral position during testing.

The ignition switch (hereinafter referred to as IGN) is then turned on to activate the electronic control unit 10. The moment the electronic control unit (hereinafter referred to as ECU) starts up, the old data in a program stored in the ECU for judging whether or not to start a test mode will be cleared for initialization. The subsequent steps are carried out in accordance with the flow chart of FIG. 5. Though the signals from the sensors about the wheel speed are fed to the memory unit of the ECU all the while, logic operations for the calculation of a reference wheel speed are not executed immediately but instead are initiated after a decision-making step has been completed.

Next, it is decided whether or not to enter into the test mode. This procedure is carried out in the order shown in the flow chart of FIG. 6, when the ECU is started up. The left half of FIG. 6 indicates the program contained in the ECU and the right half indicates the program contained in the testing device. The signals used for this start-up procedure are in the form of a plurality of bytes of data signals (one byte is equivalent to 8 bits).

A signal $DT_1$ is transmitted from the output port 6d (expressed as Sout in the flow chart) of the check terminal of ECU to the testing device through the input port 6'd (expressed as Sout in the flow chart). If it is recognized by the testing device that the signal has been received, a signal $DR_1$ is transmitted from its output port 6a' (expressed as Sin) to the ECU after a predetermined time $T_1$. If the receipt of the signal in a specified time T is confirmed by the ECU, another signal $DT_2$ is transmitted from the ECU to the testing device. If it is recognized by the testing device that the signal $DT_2$ has been received at Sout within a predetermined period, it will transmit a signal $DR_2$ to the ECU. Signals $DT_3$ and $DR_3$ will be further exchanged as shown in the drawing. In the preferred embodiment, if the ECU receives the signal $DR_3$ within a specified time T, the test mode entry signal will be set. If not, the test mode entry signal will not be set, resetting the ECU into a standby position.

Upon setting of the test mode entry signal, logic operations will be carried out in the ECU to calculate a reference wheel speed and the like based upon the data about the wheel speeds. Upon reconfirmation of the existence of the test mode entry signal, the test mode processing program will be executed according to the data obtained as a result of logic operations in the ECU. Such data are first sent to the testing device through the check terminal so as to be inputted in various test programs provided in the testing device. Various command signals produced according to the test programs are then sent back to the ECU, causing the ECU in a test mode to transmit test signals to the driving circuits which in turn send driving signals to external actuators.

If no test mode entry set signal exists, the test mode processing program will not be executed, and the control circuit in the ECU will return to an ordinary operation mode to control the vehicle according to the abovementioned data, such as wheel speeds.

FIG. 7 shows two examples of signal exchange timing arrangements which allow the ECU and the testing device to be linked together in such a manner that the ECU will operate in a special mode for a checkup.

In FIG. 7b, signals $DT_1$ to $DT_n$ are transmitted from the ECU to the testing device within a specified time $T_1$ in the first place If the signals are received by the testing device within time $T_1$, signals $DR_1$ to $DR_n$ are then transmitted from the testing device to the ECU. If the ECU receives the signals within time $T_2$, the test mode will start. Other timing arrangements than the examples shown in FIG. 7 may be used.

We have so far described the method of the present invention applied to an anti-lock brake control assembly merely by way of example. It will be easy for one skilled in the art to understand that the method of the present invention will be applicable to other control devices such as a traction control device.

What is claimed is:

1. A method for establishing a testing link between an electronic control unit mounted on a motor vehicle and a testing unit, the testing unit being coupled to the electronic control unit to enable an exchange of signalling therebetween, the method comprising the steps of:

storing test programs in the testing unit to the testing unit;

transmitting a first plurality of serial data from the electronic control unit to the testing unit;

transmitting a second plurality of serial data from the testing unit to the electronic control unit in response to the first plurality of serial data transmitted from the electronic control unit to the testing unit;

setting the electronic control unit from a normal mode into a test mode for testing the electronic control unit in response to the second plurality of serial data transmitted from the testing unit to the electronic control unit;

testing the electronic control unit in accordance with the stored test programs;

wherein the electronic unit will only be set in the test mode upon receiving the second plurality of serial data, thereby preventing the electronic control unit from inadvertently leaving the normal mode of operation.

2. A method as claimed in claim 1, wherein the electronic control unit will be set in the test mode only upon receiving the second plurality of serial data within a specified period of time subsequent to the transmitting of the first plurality of serial data from the electronic control unit to the testing unit.

* * * * *